United States Patent
Dewangan et al.

(10) Patent No.: US 9,803,728 B2
(45) Date of Patent: Oct. 31, 2017

(54) ROTARY VARIATOR FOR A CONTINUOUSLY VARIABLE TRANSMISSION

(71) Applicant: GM Global Technology Operations LLC, Detroit, MI (US)

(72) Inventors: Yogesh Kumar Dewangan, Dhamtari (IN); Venu Ganti, Marathahall (IN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 182 days.

(21) Appl. No.: 14/861,480

(22) Filed: Sep. 22, 2015

(65) Prior Publication Data

US 2017/0082178 A1   Mar. 23, 2017

(51) Int. Cl.
*F16H 9/10*   (2006.01)

(52) U.S. Cl.
CPC .................................. *F16H 9/10* (2013.01)

(58) Field of Classification Search
CPC .................................. F16H 9/10; F16H 55/54
See application file for complete search history.

(56) References Cited

U.S. PATENT DOCUMENTS

| | | |
|---|---|---|
| 4,768,996 A | 9/1988 | Kumm |
| 4,810,234 A | 3/1989 | Kumm |
| 4,854,921 A | 8/1989 | Kumm |
| 4,875,894 A | 10/1989 | Clark |
| 4,990,123 A * | 2/1991 | Krude ....................... F16H 9/10 474/110 |
| 5,290,206 A | 3/1994 | Graham |
| 5,492,506 A | 2/1996 | Lorance |
| 5,547,429 A | 8/1996 | Hirabayashi et al. |
| 5,582,555 A | 12/1996 | Miller |
| 6,152,844 A | 11/2000 | Daugherty |
| 6,379,275 B1 | 4/2002 | Serkh |
| 6,656,070 B2 | 12/2003 | Tay |
| 7,077,771 B2 | 7/2006 | Jeng |
| 7,261,655 B2 | 8/2007 | Vargas |
| 7,563,185 B2 | 7/2009 | Naude |
| 7,951,027 B2 | 5/2011 | An |
| 8,360,908 B2 | 1/2013 | Serkh |
| 8,628,439 B2 | 1/2014 | Tay |
| 2004/0198542 A1 * | 10/2004 | Fuerle ....................... F16H 9/24 474/162 |

FOREIGN PATENT DOCUMENTS

FR   2850437 A1   7/2007

* cited by examiner

*Primary Examiner* — William E Dondero
*Assistant Examiner* — Robert T Reese

(57) ABSTRACT

A continuously variable transmission pulley includes a body defining a hollow tube having a longitudinal central bore. Multiple cylinders are fixed to the body each having a cylinder bore in fluid communication with the longitudinal central bore. A piston is slidably positioned in the cylinder bore of each of the cylinders. A pressurized fluid present in the central bore acts equally against each of the pistons to equally outwardly displace the pistons. A biasing member is connected to each piston and is in direct contact with the pressurized fluid. A friction member is connected to a free end of each of the pistons. Diametrically opposed ones of the friction members define a pulley diameter that varies depending on a portion of the diametrically opposed ones of the pistons extending outwardly from the cylinders.

18 Claims, 4 Drawing Sheets

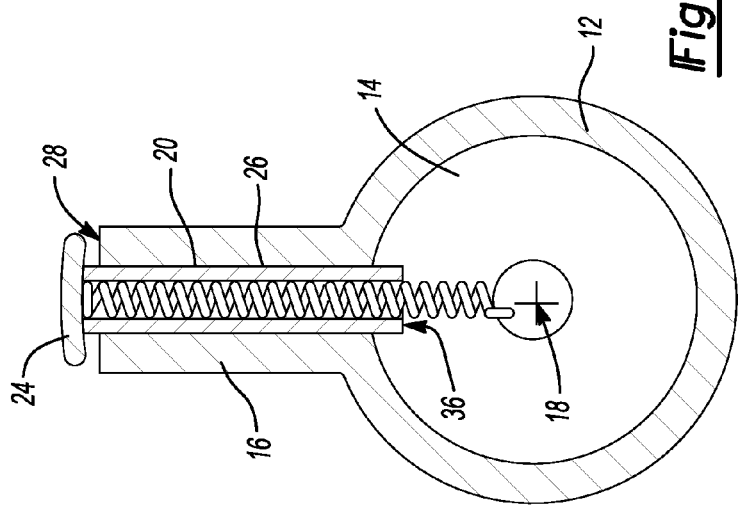
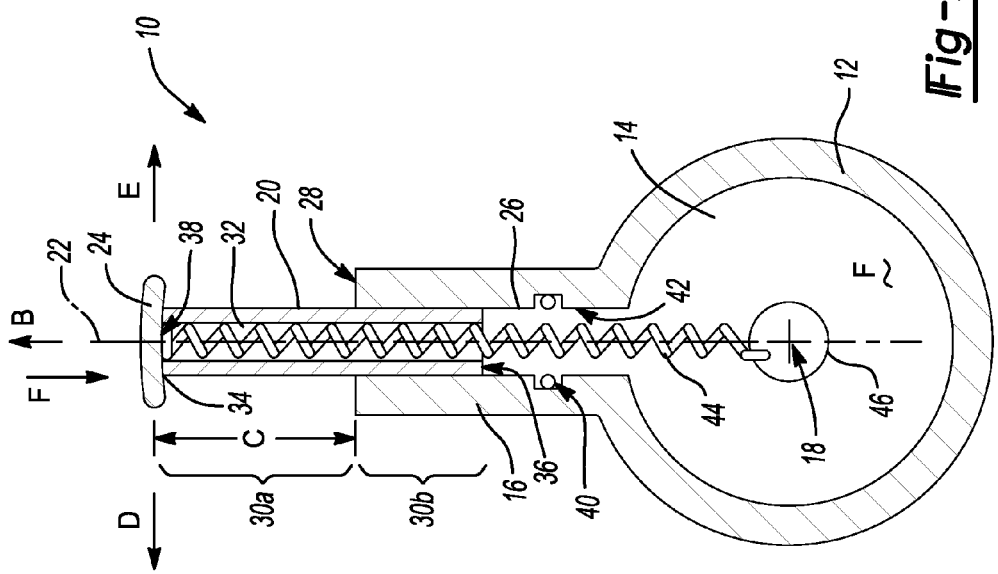

ROTARY VARIATOR FOR A CONTINUOUSLY VARIABLE TRANSMISSION

FIELD

The present disclosure relates to automatic transmissions and more particularly to pulleys for a continuously variable transmission.

BACKGROUND

The statements in this section merely provide background information related to the present disclosure and may or may not constitute prior art.

A continuously variable transmission ("CVT") typically includes a belt and pulley system that operatively couples a rotary power source, such as an engine or electric motor, to a double gear final drive unit. The belt and pulley system generally includes first and second pairs of pulley cones having a torque transmitting belt or chain extending between the cone pairs. Each pulley cone pair includes an axially stationary pulley member and an axially movable pulley member. Each movable pulley member is axially adjustable with respect to the stationary pulley member by a hydraulic system. The hydraulic system provides primary and secondary hydraulic pressures to the respective movable pulley members to adjust the running radius of the first and second pulley cone pairs which in turn controls the output/input ratio of the continuously variable transmission. Movement of the cones steplessly or continuously varies the ratio of an input speed to an output speed. With the continuously variable transmission, small but effective ratio changes can be attained. This is in contrast to a fixed gear ratio unit where any ratio changes are step values.

Known pulley designs exhibit high axial loading on the shaft due to friction. To minimize the axial loading on the shaft, high capacity bearings are used to mount the shaft, resulting in both cost and weight increase to the power plant. The high capacity bearings further increase a space envelope of the assembly, thereby increasing an axial length of the transmission.

Known variator designs for CVT transmissions have their advantages, however, there is a need in the art for a CVT variator that limits axial loads on the output shaft allowing the elimination of the high capacity bearings now used.

SUMMARY

According to one aspect of the present disclosure, a continuously variable transmission pulley includes a body defining a hollow tube having a longitudinal central bore. Multiple cylinders are fixed to the body having successive ones of the cylinders equally spaced about a perimeter of the body. A central axis of each of the cylinders is aligned with a longitudinal center axis of the central bore of the body. A piston is slidably positioned in a cylinder bore of each of the cylinders, the piston co-axially aligned with the central axis of the cylinder. A pressurized fluid present in the central bore acts equally against each of the pistons to equally outwardly slidably displace the pistons.

According to a further aspect, a friction member is connected to a free end of each of the pistons, diametrically opposed ones of the friction members defining a pulley diameter that varies depending on a portion of the piston extending outwardly from each of the cylinders.

In another aspect, the diameter is directly proportional to a pressure of the fluid.

In yet another aspect, a biasing member is connected to each piston, each biasing member is in direct contact with the pressurized fluid and is positioned partially within one of the cylinder bores as the piston outwardly extends.

In yet another aspect, a biasing force of the biasing member acts co-axial to the central axis of the cylinder and acts to continuously retract the piston toward a piston fully retracted position.

In yet another aspect, a first end of the biasing member is connected to the friction member and a second end of the biasing member is connected to a shaft positioned within the central bore.

In yet another aspect, a friction member is connected to a free end of each of the pistons; and a biasing member extends through a piston bore and is connected to the friction member of each of the pistons, each biasing member in direct contact with the pressurized fluid and also positioned partially within one of the cylinder bores as the piston outwardly extends.

In yet another aspect, each piston is slidably received in the cylinder bore with the piston co-axially aligned with the central axis of the cylinder, and a portion of each piston is retained within the cylinder bore between a fully retracted position and an extended position of the piston.

In yet another aspect, the pressurized fluid is a hydraulic fluid having a pressure controlled by a hydraulic control system.

In yet another aspect, the friction member includes a first portion and a second portion, the first portion including an outwardly directed face that directly and non-slidably contacts an inner facing perimeter wall of a flexible drive member.

In yet another aspect, the second portion includes an inwardly directed face that directly and non-slidably contacts an outward facing perimeter wall of the flexible drive member having the flexible drive member restrained between the first portion and the second portion.

In yet another aspect, the first portion is directly fixed to the second portion outside of the flexible drive member.

In yet another aspect, a radial spacing of a flexible drive member disposed in contact with multiple ones of the friction members measured from the center axis is maintained between successive ones of the friction members.

Further aspects, examples, and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 2 is a cross sectional elevational view taken at section 2 of FIG. 1, showing a single piston and cylinder assembly of the continuously variable transmission variator of FIG. 1 in a piston fully extended position;

FIG. 3 is a cross sectional elevational view of the single piston and cylinder assembly similar to FIG. 2, modified to show a piston fully retracted position;

DETAILED DESCRIPTION

The following description is merely exemplary in nature and is not intended to limit the present disclosure, application, or uses.

Figure 1:
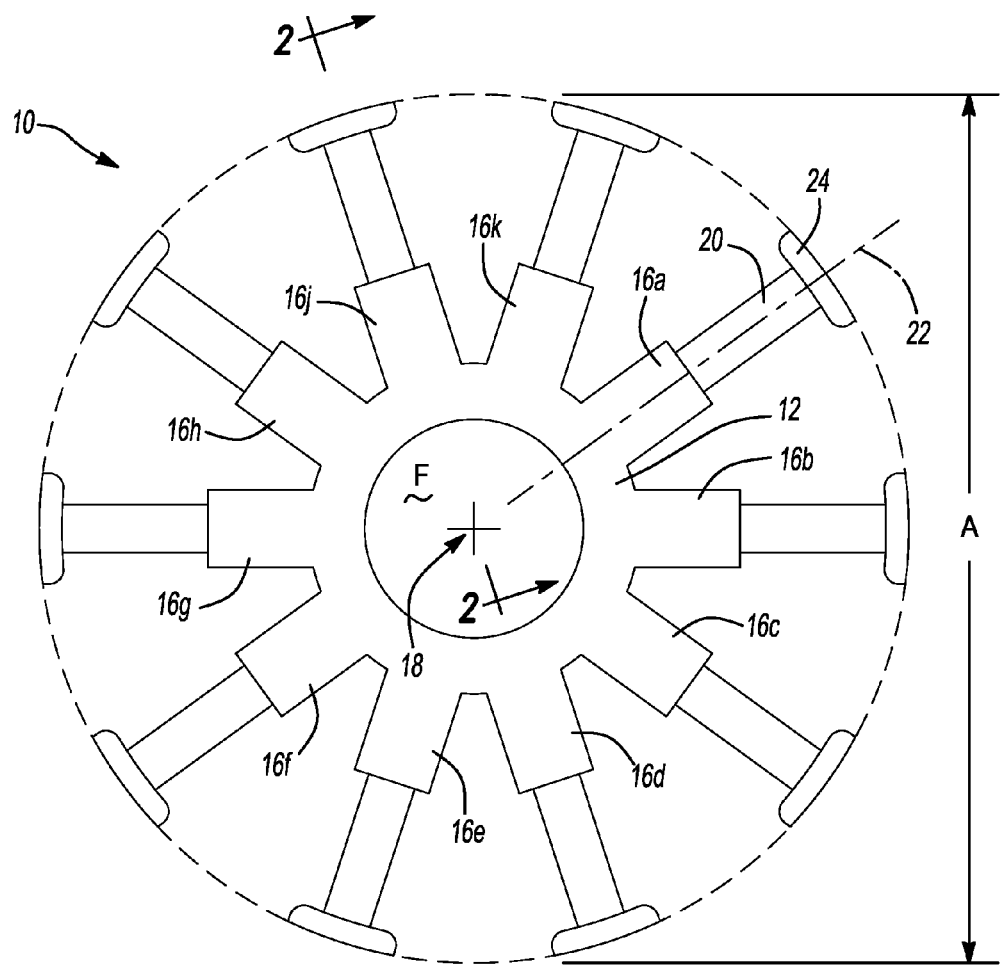
FIG. 1 is an end elevational view of a continuously variable transmission variator according to the principles of the present disclosure.

Referring to FIG. 1, a wheel or variator pulley 10 for a motor vehicle CVT includes a hub or body 12 which can be for example a hollow tube or axle having a longitudinal central bore 14. A plurality of cylinders 16, which according to several aspects includes cylinders 16a through 16k, are fixed to the body 12 for example by welding or by a forging operation such that successive ones of the cylinders (e.g., 16a, 16b) are equally spaced about a perimeter of the body 12 and therefore are positioned at equal successive angles. A central axis 22 of each of the cylinders 16 is aligned with a longitudinal center axis 18 of the central bore 14 of the body 12. Each cylinder 16 slidably houses a piston 20, each piston 20 being co-axially aligned with the central axis 22 of its individual cylinder 16. A friction member 24 is connected to a free end of each of the pistons 20. Diametrically opposed ones of the friction members 24 define a diameter "A" that can vary depending on how much of the pistons 20 extend outwardly from each of the cylinders 16. A pressure of a fluid "F" such as a hydraulic fluid present in the central bore 14 is controlled by a hydraulic control system (shown and described in reference to FIG. 7). The pressurized hydraulic fluid "F" acts equally against each of the pistons 20 to outwardly slidably extend the pistons 20 from their respective cylinder 16, such that the diameter "A" is directly proportional to the hydraulic fluid pressure. The diameter "A" can therefore be varied by increasing or decreasing the pressure of the hydraulic fluid "F" in the central bore 14.

Referring to FIG. 2 and again to FIG. 1, an exemplary one of the cylinders 16 is shown, with the remaining cylinders removed for clarity. The piston 20 is slidably received in a cylinder bore 26 created in the cylinder 16 such that the piston 20 is co-axially aligned with the central axis 22 of the cylinder 16. As the pressure of the hydraulic fluid "F" in the central bore 14 is increased and acts against the piston 20, the piston 20 slides radially outwardly through the cylinder bore 26 in a direction "B". This displacement changes a height "C" between the friction member 24 and an end face 28 of the cylinder 16 which defines a first portion 30a of the piston extending outwardly of the cylinder 16. A second portion 30b of the piston 20 is retained within the cylinder bore 26 to offset a lateral force acting on the friction member 24 in either a transverse direction "D" or an opposite direction "E" from a load applied by a belt or chain to the friction member 24, shown and described in reference to FIGS. 3 and 4. According to several aspects, approximately 15% of the length of the piston 20 is retained within the cylinder bore 26 in the fully extended position to offset transverse loads applied to the piston 20. According to further aspects, the piston 20 is square or rectangular in shape to prevent axial rotation of the piston 20 within the cylinder bore 26, however other geometries or features may be used for the piston 20 to prevent piston axial rotation, including but not limited to a key and slot (not shown), an oval shape for the piston and cylinder bore 26, or the like. According to other aspects, a shoulder (not shown) can be included with each of the pistons 20, the shoulder contacting an inner shelf or wall (not shown) in the cylinder bore 26 to act as a positive stop to prevent the pistons 20 from being displaced out of the cylinders 16.

According to several aspects, the piston 20 is substantially hollow, having a central piston bore 32. The friction member 24 is fixed to a free end 34 of the piston 20. Pressure applied to an end face 36 of the piston 20 and to an interior facing surface 38 of the friction member 24 acting in the direction "B" is equal and opposite to a force applied in a direction "F" to the friction member 24 from a belt or chain (shown and described in reference to FIG. 4). One or more seal members 40 such as O-rings may be provided in grooves created in a piston bore wall 42 to allow sliding motion of the piston 20 while retaining pressure in the central bore 14 and therefore in the cylinder bore 26 between the central bore 14 and at the end face 36 of the piston 20. A biasing member such as a coiled tension spring 44 is connected at a first end to the friction member 24, extends through the piston bore 32, and is fixed at an opposite second end to a shaft 46 positioned within the central bore 14. In order to directly align the force axis of the spring 44 with the central axis 22 of the cylinder 16, the spring 44 is in direct contact with the hydraulic fluid and is positioned partially within the cylinder bore 26 and the piston bore 32 as the piston 20 outwardly extends in the direction "B". A biasing force of the spring 44 continuously acts to pull the friction member 24 and the piston 20 toward a closed or retracted position shown and described in reference to FIG. 3.

Referring to FIG. 3 and again to FIGS. 1 and 2, the piston 20 is shown in its fully retracted position within the cylinder bore 26. With further reference to FIG. 2, when the pressure in the cylinder bore 26 acting against the end face 32 of the piston 20 and the interior facing surface 38 of the friction member 24 is reduced, the piston 20 is retracted toward the center axis 18 assisted by the biasing force of the spring 44. In the fully retracted position, the end face 36 of the piston 20 may be positioned within the central bore 14. In the fully retracted position, the pressure of the fluid in the central bore 14 is controlled to prevent the friction member 24 from directly contacting the end face 28 of the cylinder 16, and a minimum diameter "A" of the pulley 10 is defined by the fully retracted position.

Referring to FIG. 4 and again to FIGS. 1-3, two pulleys of the present disclosure are presented in an exemplary installation for operation in a continuously variable transmission pulley unit. A first pulley, pulley 10, is installed on an input shaft, and a second pulley which is substantially identical to the first pulley 10 and designated as a second pulley 46 is mounted on a main or output shaft. The second pulley includes multiple pistons 48 slidably disposed in cylinders 50, which are fixed to a hub or body 52. A friction member 54 is connected to a free end of each of the pistons 48 and moves inwardly or outwardly with respect to a longitudinal central axis 56 of the body 52 to establish a diameter of the second pulley 46. A distance "S" between the longitudinal center axis 18 of the first pulley 10 and the longitudinal center axis 56 of the second pulley 46 is constant.

For a higher ratio operation of the continuously variable transmission pulley unit, the hydraulic pressure to the first pulley 10 is reduced, causing retraction of the pistons 20 due to the biasing force of the springs 44, thereby producing a minimum diameter $A_{min}$ with respect to the longitudinal center axis 18 of the central bore 14 of the body 12. The pistons 20 of the first pulley 10 are fully retracted into their respective cylinders 16 and a flexible drive member 58 such as a resilient material belt is in contact with multiple ones of the friction members 24. At the same time, the hydraulic pressure applied to the pistons 48 of the second pulley 46 is increased. The pistons 48 of the second pulley 46 extend outwardly from their respective cylinders 50 and the flexible drive member 58 is also in contact with multiple ones of the plurality of friction members 54. Increasing the hydraulic pressure to the second pulley 46 produces a maximum diameter $A_{max}$ determined from the friction members 54 with respect to the longitudinal center axis 56 of the body 52 of the second pulley 46.

Referring to FIG. 5 and again to FIGS. 1-4, for a lower ratio operation of the continuously variable transmission pulley unit, the hydraulic pressure to the first pulley 10 is increased, outwardly extending the pistons 20 and producing a maximum diameter $A_{max}$ with respect to the longitudinal center axis 18 of the central bore 14 of the body 12 of the first pulley 10. At the maximum diameter $A_{max}$ the pistons 20 are fully extended from their respective cylinders 16 and the flexible drive member 58 is in contact with multiple ones of the friction members 24. At the same time, the hydraulic pressure applied to the second pulley 46 is decreased. The pistons 48 of the second pulley 46 are fully retracted into their respective cylinders 50 due to the biasing force of the springs of the second pulley 46, with the flexible drive member 58 contacting multiple ones of the friction members 54. Decreasing the hydraulic pressure to the second pulley 46 produces a minimum diameter $A_{min}$ between diametrically opposed friction members 54 with respect to the longitudinal center axis 56 of the body 52 of the second pulley 46. According to several aspects, in order to help retain the flexible drive member 58, the friction members 24, 54 can include first and second portions, which will be described in greater detail in reference to FIG. 6.

Figure 4:
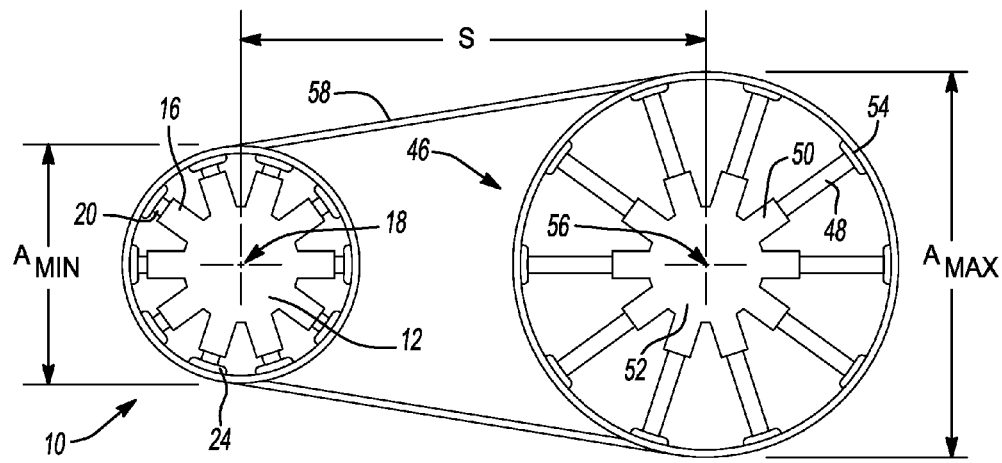
FIG. 4 is a front elevational view of first and second variators of the present disclosure operating in a high ratio configuration.
Figure 5:
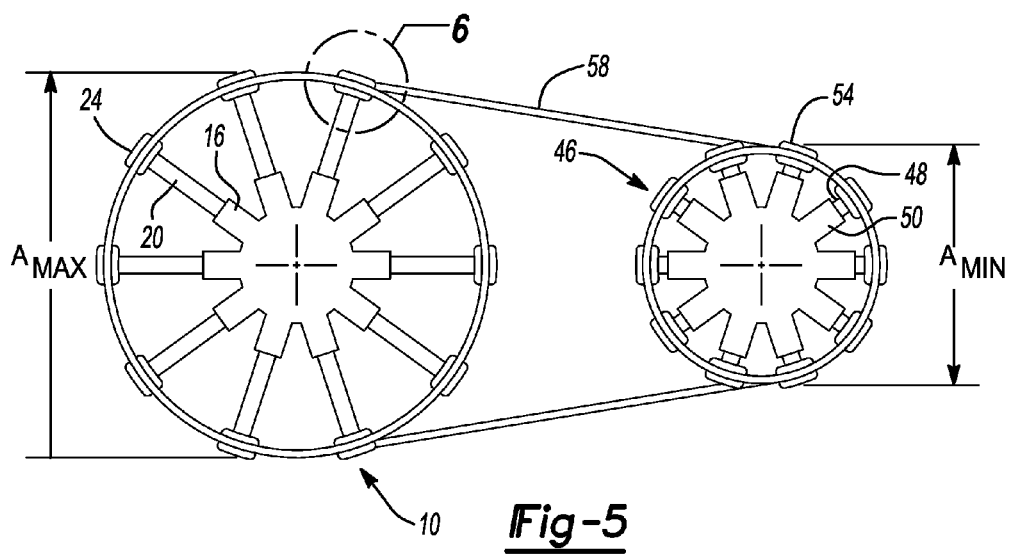
FIG. 5 is a front elevational view of the first and second variators of FIG. 4 operating in a low ratio configuration.

Referring to both FIGS. 4 and 5, a first hydraulic pressure applied to the first pulley 10 and a second hydraulic pressure applied to the second pulley 46, which can vary from the first hydraulic pressure, can also be proportionally moderated to vary the diameters of both of the first and the second pulleys 10, 46 between the minimum diameter $A_{min}$ and the maximum diameter $A_{max}$. This provides a substantially infinite range of diameters between the minimum diameter $A_{min}$ and the maximum diameter $A_{max}$.

Figure 6:
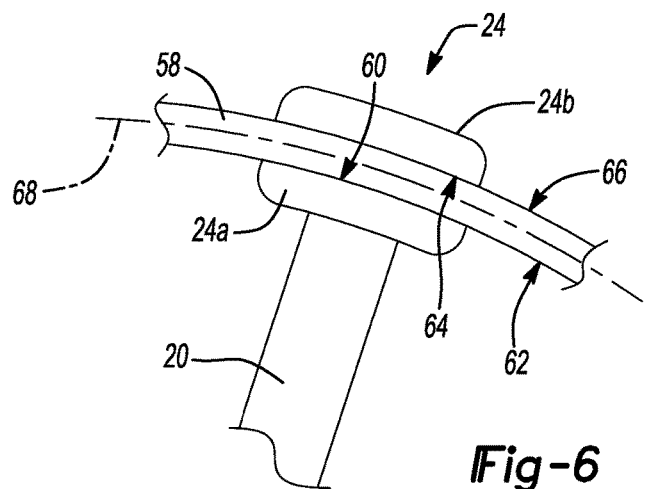
FIG. 6 is an end elevational view of area 6 of FIG. 5.

Referring to FIG. 6, to help retain the flexible drive member 58 at all pulley diameters and during diameter changes of the first pulley 10 and the second pulley 46, the friction members 24, 54 can include first and second portions. Because the friction members 54 are substantially identical to the friction members 24, the following discussion of friction members 24 applies equally to friction members 54. The friction members 24 can include a first portion 24a and a second portion 24b. The first portion 24a includes an outwardly directed face 60 that directly and non-slidably contacts an inner facing perimeter wall 62 of the flexible drive member 58. The second portion 24b includes an inwardly directed face 64 that at the same time directly and non-slidably contacts an outward facing perimeter wall 66 of the flexible drive member 58. The flexible drive member 58 is therefore frictionally held between the first portion 24a and the second portion 24b. The first portion 24a is directly fixed to the second portion 24b by a member positioned on a side of the flexible drive member 58 facing away from the viewer as seen in FIG. 6. A similar configuration is also provided for the friction members 54 of the second pulley 46, which is therefore not shown. A radial spacing 68 of the flexible drive member 58 from the center axis 18 is therefore maintained between successive friction members 24 of the first pulley 10, and the same or a different radial spacing of the flexible drive member 58 is therefore maintained between successive friction members 54 of the second pulley 46.

The torque transmitting and endless flexible drive member 58, such as a belt or chain is mounted between the first pulley 10 and the second pulley 46. Drive torque communicated to the first pulley 10 is transferred via friction to the endless member 58, and transferred via friction to the second pulley 46. The ratio of the diameter of the first pulley 10 to the diameter of the second pulley 46 is adjusted by varying the diameter "A" of the first and second pulleys 10, 46. The effective diameters of the first and the second pulleys 10 and 46 therefore change, which in turn changes the overall gear ratio between the first pulley 10 and the second pulley 46. With continuing reference to FIG. 4, because the distance "S" between the longitudinal center axis 18 of the first pulley 10 and the longitudinal center axis 56 of the second pulley 46 is constant, and the length of the endless member 58 is also constant, the radial inward or outward displacement of the pistons 20, 48 of the first and second pulleys 10, 46 must occur simultaneously in order to maintain the proper amount of tension on the endless member 58 to assure torque is transferred between the first and second pulleys 10, 46 and the endless member 58.

Figure 7:
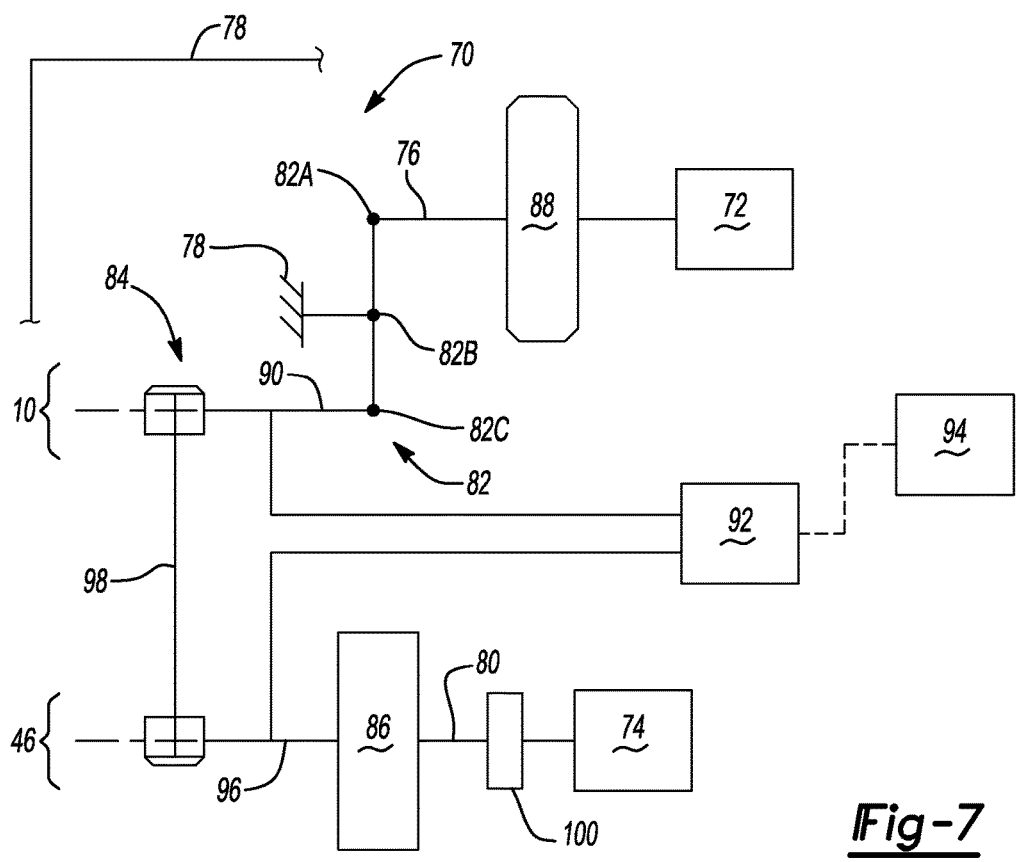
FIG. 7 is a diagrammatic presentation of a continuously variable transmission having first and second variator pulleys of the present disclosure.

Referring to FIG. 7, a continuously variable transmission ("CVT") for use in a powertrain of a motor vehicle is generally indicated by reference number 70. The CVT 70 is a variable diameter pulley drive transmission. The CVT 70 is interconnected to an engine 72 and a final drive unit 74. The engine 72 may be a conventional gasoline, Diesel, or flex fuel internal combustion engine, a hybrid engine, or an electric motor, or any other type of prime mover, without departing from the scope of the present disclosure. The engine 72 supplies a driving torque to the CVT 70 through, for example, a transmission input member or shaft 76. The transmission input member or input shaft 76 may be separate from the CVT 70 and form part of or be connected with a flywheel or other output from the engine 72.

The CVT 70 includes a typically cast metal housing 78 which encloses and protects the various components of the CVT 70. The housing 78 has a variety of apertures, passageways, shoulders and flanges which position and support these components. The CVT 70 includes the transmission input shaft 76 and a transmission output shaft 80. According to several aspects, connected between the transmission input shaft 76 and the transmission output shaft 80 is a speed change device 82, a pulley assembly or continuously variable unit 84, and a gearbox 86 that cooperate to provide forward and reverse speed or gear ratios between the transmission input shaft 76 and the transmission output shaft 80. The gearbox 86 and CVT 70 share, at least in some locations, the housing 78. The transmission input shaft 76 is functionally connected with the engine 72 and receives input torque or power from the engine 72 through a starting device 88. The transmission output shaft 80 is preferably connected with the final drive unit 74. The transmission output shaft 80 provides drive torque to the final drive unit 74. The final drive unit 74 unit may include a differential, axle shafts, and road wheels (not shown).

The transmission input shaft 76 is connected to the speed change device 82. In an alternate embodiment, the speed change device 82 is omitted from the CVT 70. The speed change device 82, as well as the gearbox 86 arrangement described below, are illustrated in a lever diagram format. A lever diagram is a schematic representation of the components of a mechanical device such as meshing gear sets or planetary gear sets. Each individual lever represents a planetary gear set or meshed gear pair. The three basic mechanical components of the planetary gear are each represented by a node while the gear pairs are represented by a node and the rotation change represented by a node fixed to ground. Therefore, a single lever contains three nodes. In a planetary gear set, one node represents the sun gear, one the planet gear carrier, and one the ring gear. In a meshed gear pair, one node represents a first gear, one a second gear, and the third the rotational direction change between the meshed gears.

In some cases, two levers may be combined into a single lever having more than three nodes (typically four nodes). For example, if two nodes on two different levers are connected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or connections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

For example, the speed change device 82 includes a first node 82A, a second node 82B, and a third node 82C. The first node 82A is coupled to the transmission input shaft 76. The second node 82B is fixed to ground representing a change in rotational direction. The third node 82C is coupled to a first transfer shaft or member 90 that is connected to the continuously variable unit 84. The first node 82A preferably represents a first gear while the third node 82C preferably represents a second gear meshed with the first gear. The gears may be co-planar or partially axially offset. The speed change device 82 may be an overdrive speed change device 82 that increases the speed of the first transfer shaft 96 relative to the transmission input shaft 76 while decreasing the torque. Alternatively, the speed change device 82 may be an underdrive speed change device 82 that decreases the speed of the first transfer shaft 96 relative to the transmission input shaft 76 while increasing torque. The speed change device 82 may also be a direct drive coupling member with no relative speed change.

The continuously variable unit 84 includes the first pulley 10 and the second pulley 46. The diameter of the first pulley 10 is controlled by a hydraulic control system 92 or other actuating system which receives control signals from a transmission control system 94. The second pulley 46 is directly connected for rotation with a second transfer member or shaft 96 or may be integrally formed with the second transfer shaft 96. The diameter of the second pulley 46 is also controlled by the hydraulic control system 92 or other actuating system which receives control signals from the transmission control system 94.

A torque transmitting endless member, chain, or belt hereinafter referred to as belt 98, is mounted between the first pulley 10 and the second pulley 46. It should be appreciated that other types of belts, including positive engagement devices or chains, may be employed without departing from the scope of the present disclosure. Drive torque communicated from the transmission input shaft 76 is transferred via friction between the first and the second pulleys 10, 46 and the belt 98. The ratio of the input or first pulley 10 to the output or second pulley 46 is adjusted by varying the diameters of the first pulley 10 and the second pulley 46. For example, to change the ratio between the pulleys 10 and 46, the diameter of the first pulley 10 may be reduced while simultaneously the diameter of the second pulley 46 may be increased. Therefore the effective diameters of the first and second pulleys 10, 46 change, which in turn changes the overall gear ratio between the first pulley 10 and the second pulley 46. With reference again to FIG. 4, since the radial distance "S" between the first and the second pulleys 10, 46 and the length of the belt 98 is constant, the pulley diameter changes must occur simultaneously in order to maintain the proper amount of tension on the belt 98 to assure torque is transferred from the first and the second pulleys 10, 46 to the belt 98.

The continuously variable unit 84 transfers torque to the gearbox 86 via the second transfer shaft 96. The gearbox 86 transfers torque from the continuously variable unit 84 to the transmission output shaft 80. The transmission output shaft 80 can transfer torque to a chain drive 100, which can transfer torque to the final drive unit 74.

According to several aspects, a continuously variable transmission pulley 10 includes a body 12 defining a hollow tube having a longitudinal central bore 14. Multiple cylinders 16 are fixed to the body 12 each having a cylinder bore 26 in fluid communication with the longitudinal central bore 14. A piston 20 is slidably positioned in the cylinder bore 26 of each of the cylinders 16. A pressurized fluid "F" present in the central bore 14 acts equally against each of the pistons 20 to equally outwardly displace the pistons 20. A biasing member 44 is connected to each piston 20 and is in direct contact with the pressurized fluid "F". A friction member 24 is connected to a free end of each of the pistons 20. Diametrically opposed ones of the friction members 24 define a diameter "A" that varies depending on a portion 30a of the diametrically opposed ones of the pistons 20 extending outwardly from the cylinders 16.

The description of the invention is merely exemplary in nature and variations that do not depart from the gist of the invention are intended to be within the scope of the invention. Such variations are not to be regarded as a departure from the spirit and scope of the invention.

The following is claimed:
1. A continuously variable transmission pulley, comprising:
   a body defining a hollow tube having a longitudinal central bore;
   multiple cylinders fixed to the body having successive ones of the cylinders equally spaced about a perimeter of the body;
   a central axis of each of the cylinders is aligned with a longitudinal center axis of the central bore of the body; and
   a piston slidably positioned in a cylinder bore of each of the cylinders, the piston co-axially aligned with the central axis of the cylinder;
   a friction member connected to a free end of each of the pistons, diametrically opposed ones of the friction members defining a pulley diameter that varies depending on a portion of the piston extending outwardly from each of the cylinders, wherein the friction member includes a first portion and a second portion, the first portion including an outwardly directed face that directly and non-slidably contacts an inner facing perimeter wall of a flexible drive member;

wherein a pressurized fluid present in the central bore acts equally against each of the pistons to equally outwardly slidably displace the pistons.

2. The continuously variable transmission pulley of claim 1, wherein the diameter is directly proportional to a pressure of the fluid.

3. The continuously variable transmission pulley of claim 1, wherein the second portion includes an inwardly directed face that directly and non-slidably contacts an outward facing perimeter wall of the flexible drive member having the flexible drive member restrained between the first portion and the second portion.

4. The continuously variable transmission pulley of claim 1, wherein the first portion is directly fixed to the second portion outside of the flexible drive member.

5. The continuously variable transmission pulley of claim 1, further comprising:
a biasing member extending through a piston bore and connected to the friction member of each of the pistons, each biasing member in direct contact with the pressurized fluid and also positioned partially within one of the cylinder bores as the piston outwardly extends.

6. The continuously variable transmission pulley of claim 5, wherein a biasing force of the biasing member acts co-axial to the central axis of the cylinder to continuously retract the piston toward a piston fully retracted position.

7. The continuously variable transmission pulley of claim 5, wherein a first end of the biasing member is connected to the friction member and a second end of the biasing member is connected to a shaft positioned within the central bore.

8. The continuously variable transmission pulley of claim 1, wherein the cylinders are fixed to the body.

9. The continuously variable transmission pulley of claim 1, wherein each piston is slidably received in the cylinder bore created in the cylinder such that the piston is co-axially aligned with the central axis of the cylinder and a portion of each piston is retained within the cylinder bore between a fully retracted position and an extended position of the piston.

10. The continuously variable transmission pulley of claim 1, wherein the pressurized fluid is a hydraulic fluid having a pressure controlled by a hydraulic control system.

11. The continuously variable transmission pulley of claim 1, wherein a radial spacing of a flexible drive member disposed in contact with multiple ones of the friction members measured from the longitudinal center axis is maintained between successive ones of the friction members.

12. A continuously variable transmission pulley, comprising:
a body defining a hollow tube having a longitudinal central bore;
multiple cylinders fixed to the body each having a cylinder bore in fluid communication with the longitudinal central bore;
a piston slidably positioned in the cylinder bore of each of the cylinders, such that a pressurized fluid present in the longitudinal central bore acts equally against each of the pistons to equally outwardly displace the pistons;
a biasing member connected to each piston and in direct contact with the pressurized fluid; and
a friction member connected to a free end of each of the pistons, wherein diametrically opposed ones of the friction members define a diameter that varies depending on a portion of the diametrically opposed ones of the pistons extending outwardly from the cylinders.

13. The continuously variable transmission pulley of claim 12, wherein each of the biasing members is positioned partially within one of the cylinder bores as the pistons outwardly displace and acts to continuously retract one of the pistons toward a piston fully retracted position.

14. The continuously variable transmission pulley of claim 12, wherein a central axis of each of the cylinders intersects a longitudinal center axis of the central bore of the body, and wherein each piston is co-axially aligned with the central axis of one of the cylinders.

15. A continuously variable transmission pulley unit, comprising:
first and second pulleys, each including:
a body defining a hollow tube having a longitudinal central bore;
multiple cylinders fixed to the body having successive ones of the cylinders equally spaced about a perimeter of the body;
a central axis of each of the cylinders aligned with a longitudinal center axis of the central bore of the body;
a piston slidably positioned in a cylinder bore of each of the cylinders, the piston co-axially aligned with the central axis of the cylinder;
a pressurized fluid present in the central bore, the pressurized fluid acting equally against each of the pistons to equally outwardly slidably displace the pistons;
a biasing member connected to each piston, each biasing member in direct contact with the pressurized fluid and positioned partially within one of the cylinder bores as the piston outwardly extends; and
a friction member connected to each of the pistons; and
an endless member in frictional contact with the friction member of at least two of the pistons of both the first pulley and the second pulley.

16. The continuously variable transmission pulley unit of claim 15, wherein the first pulley is connected for common rotation with a transmission input shaft, and the second pulley is connected for common rotation with a transmission output shaft.

17. The continuously variable transmission pulley unit of claim 15, wherein a first pressure applied to the first pulley and a second pressure applied to the second pulley are proportionally moderated to vary a diameter of each of the first pulley and the second pulley between a minimum diameter Amin and a maximum diameter Amax providing a substantially infinite range of diameters between the minimum diameter Amin and the maximum diameter Amax.

18. The continuously variable transmission pulley unit of claim 15:
wherein each friction member includes a first portion and a second portion, the first portion including an outwardly directed face that directly and non-slidably contacts an inner facing perimeter wall of a flexible drive member; and
wherein the second portion includes an inwardly directed face that
directly and non-slidably contacts an outward facing perimeter wall of the flexible drive member having the flexible drive member restrained between the first portion and the second portion.

* * * * *